United States Patent
Tsuji (10) Patent No.: US 8,978,484 B2
(45) Date of Patent: Mar. 17, 2015

(54) DRIVE TORQUE ESTIMATION DEVICE FOR COMPRESSOR AND CONDENSER USED FOR THE DEVICE

(71) Applicant: Valeo Japan Co., Ltd., Kumagaya-shi (JP)

(72) Inventor: Teruaki Tsuji, Kumagaya (JP)

(73) Assignee: Valeo Japan Co., Ltd., Saitama (JP)

( * ) Notice: Subject to any disclaimer, the term of this patent is extended or adjusted under 35 U.S.C. 154(b) by 156 days.

(21) Appl. No.: 13/711,956

(22) Filed: Dec. 12, 2012

(65) Prior Publication Data

US 2013/0167659 A1 Jul. 4, 2013

(30) Foreign Application Priority Data

Dec. 15, 2011 (JP) ................. 2011-274191

(51) Int. Cl.
| | |
|---|---|
| G01L 3/02 | (2006.01) |
| G01L 5/00 | (2006.01) |
| F25B 39/04 | (2006.01) |
| G01L 23/26 | (2006.01) |
| F25B 49/00 | (2006.01) |
| B60H 1/32 | (2006.01) |

(52) U.S. Cl.
CPC . *G01L 5/00* (2013.01); *F25B 39/04* (2013.01); *G01L 23/26* (2013.01); *F25B 49/005* (2013.01); *B60H 1/3208* (2013.01); *F25B 2500/19* (2013.01); *F25B 2700/133* (2013.01); *F25B 2700/195* (2013.01); *B60H 2001/3251* (2013.01); *B60H 2001/3273* (2013.01)
USPC .................................. 73/862.191

(58) Field of Classification Search
USPC .................................. 73/862.191
See application file for complete search history.

(56) References Cited

U.S. PATENT DOCUMENTS

| | | | |
|---|---|---|---|
| 7,558,700 B2 * | 7/2009 | Yamashita et al. | 702/183 |
| 8,375,736 B2 * | 2/2013 | Miyazaki et al. | 62/238.6 |
| 2006/0080976 A1 * | 4/2006 | Markowitz et al. | 62/129 |

FOREIGN PATENT DOCUMENTS

| | | |
|---|---|---|
| JP | 2011-033235 A | 2/2001 |
| JP | 4119143 B2 | 7/2008 |

OTHER PUBLICATIONS

English language abstract and translation for JP 4119143 extracted from espacenet.com and PAJ databases on Apr. 18, 2013, 46 pages.
English language abstract and translation for JP 2011-033235 extracted from PAJ database on Apr. 18, 2013, 27 pages.

* cited by examiner

*Primary Examiner* — Harshad R Patel
*Assistant Examiner* — Octavia Hollington
(74) *Attorney, Agent, or Firm* — Howard & Howard Attorneys PLLC (57) ABSTRACT

A drive torque estimation device secures accuracy of a drive torque of a compressor by accurately grasping a flow rate of refrigerant in a cycle. The pressure difference is detected by a condenser as a resistor for calculating the flow rate. The pressure difference between two portions based on physical quantities relating to refrigerant pressures is detected using first and second sensors arranged at two portions in the cycle. A flow rate is calculated based on the detected pressure difference. The first sensor may be an upstream-side pressure sensor arranged at an inlet of the condenser or at a high-pressure side pipe upstream of the inlet and detects a pressure of the refrigerant flowing therethrough, and the second sensor may be a downstream-side pressure sensor arranged at a gas/liquid mixed phase region of the condenser and detects a pressure of the refrigerant flowing therethrough or may be a temperature sensor.

14 Claims, 5 Drawing Sheets

- candidate position for mounting upstream-side pressure sensor
- candidate position for mounting downstream-side pressure sensor
- another candidate positions for mounting downstream-side pressure sensors

Torque estimated value: [N·m]=

$$\frac{Ps \times G \times (Pd/Ps)^n}{\text{efficiency of compressor} \times \text{specific volume} \times \text{unit matching coefficient}}$$

Ps: low pressure
Pd: high pressure
G: refrigerant flow rate

DRIVE TORQUE ESTIMATION DEVICE FOR COMPRESSOR AND CONDENSER USED FOR THE DEVICE

RELATED APPLICATIONS

This application claims priority to and all the advantages of Japanese Patent Application No. JP 2011-274191, filed on Dec. 15, 2011, the content of which is incorporated herein by reference.

BACKGROUND OF THE INVENTION

1. Field of the Invention

The present invention relates to a drive torque estimation device for a compressor which estimates a drive torque of a compressor used in a refrigerating cycle of a vehicle-use air conditioning unit mounted on a vehicle, and a condenser used for the device.

2. Description of the Related Art

The estimation with high accuracy of a torque of a compressor in a refrigerating cycle which exhibits large power consumption among vehicle-mounted auxiliary devices is an important task for reducing a fuel consumption amount of a vehicle.

Figure 6:
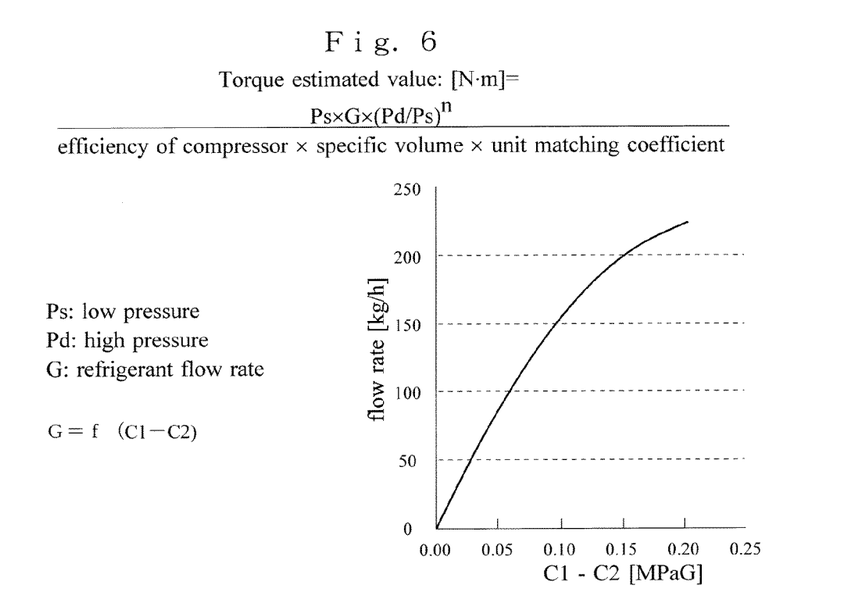
FIG. 6 is an explanatory view for explaining a technique for calculating a torque estimated value of the compressor.

As also shown in FIG. 6, a torque of a compressor can be estimated using a general formula expressed by the following formula 1, for example. Pd indicates a measured value of a discharge pressure of the compressor, and Ps indicates a measured value of a suction pressure of the compressor. Compressor total efficiency which is a variable parameter can be introduced from Pd, and a specific volume can be introduced from Ps. Further, a flow rate of a refrigerant G can be calculated by detecting the difference between a pressure C1 on an upstream side of a position in a refrigerating cycle where flow passage resistance is present and a pressure C2 on a downstream side of the position where flow passage resistance is present. A unit matching coefficient is provided for converting a mass flow rate into a volume flow rate, and is a constant.

$$\text{Torque estimated value } (N \cdot m) = Ps \times G \times (Pd/Ps)^n / \text{total efficiency of compressor} \times \text{specific volume} \times \text{unit matching coefficient}$$

Accordingly, variable parameters other than the refrigerant flow rate can be accurately grasped based on a measured values of the discharge pressure Pd and the suction pressure Ps of the compressor and hence, the accuracy of the torque estimated value of the compressor depends on the accuracy of measurement of a refrigerant flow rate G, that is, depends on how accurately the pressure difference (C1−C2) between the pressure on the upstream side of the position where the flow passage resistance is present and the pressure on the downstream side of the position can be measured.

In view of the above, in the related art, as a technique for measuring the refrigerant flow rate G in the refrigerating cycle (the technique for detecting the pressure difference between the pressure on the upstream side of the position where the flow passage resistance is present and the pressure on the downstream side of the position), there has been known a technique as described in JP-A-2011-33235 (patent literature 1) where an orifice is mounted in the inside of a refrigerant circuit and a pressure sensor is provided in front of and behind the orifice for detecting the pressure difference, and there has been also known a technique as described in Japanese Patent No. 4119143 (patent literature 2) where a condenser is used as a resistive element, a condenser pressure difference detection means which detects the pressure difference between an inlet-side refrigerant pressure and an outlet-side refrigerant pressure of the condenser is provided, and a flow rate of a refrigerant which flows through the condenser is calculated based on a detection value obtained by the condenser pressure difference detection means.

SUMMARY OF THE INVENTION

However, according to the constitution where the orifice is added to the inside of the refrigerating cycle, there arises a drawback that the refrigerant flow passage resistance in the refrigerating cycle is increased so that a drive torque of the compressor is increased.

On the other hand, the constitution where the condenser is used as the resistive element, and the pressure difference between the inlet side refrigerant pressure and the outlet side refrigerant pressure is detected is specifically configured such that a pressure difference sensor which receives the refrigerant pressure difference is arranged between a refrigerant inlet pipe and a refrigerant outlet pipe of the condenser. Accordingly, it is necessary to prevent a refrigerant in a state before heat is radiated from the refrigerant from flowing into a refrigerant in a state where heat is radiated from the refrigerant by bypassing the condenser. Further, a refrigerant which flows in the refrigerant outlet pipe of the condenser becomes a liquid-phase refrigerant thus giving rise to a drawback that the detection of the accurate pressure difference becomes difficult.

Figure 7:
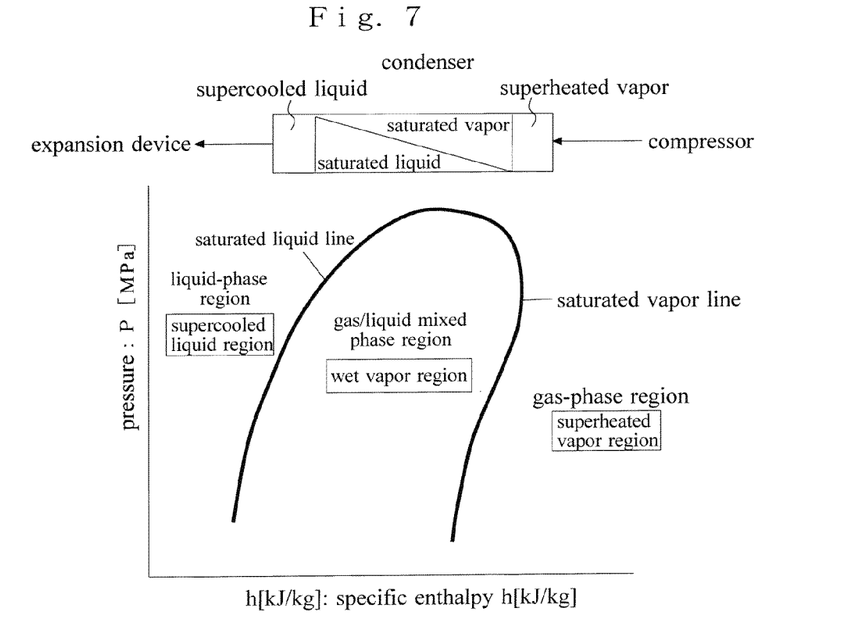
FIG. 7 is an explanatory view for explaining a change in a state of a refrigerant which passes through the condenser.

That is, in the condenser, as shown in FIG. 7, superheated vapor which assumes a high temperature and a high pressure by being compressed by a compressor is cooled thus producing saturated vapor. Thereafter, condensation of the saturated vapor is started so that the saturated vapor is liquefied. A gas-phase region or a gas/liquid mixed phase region in the condenser has a large specific volume and a flow speed in the region is fast and hence, the gas-phase region or the gas/liquid mixed phase region is liable to be influenced by the flow passage resistance. Accordingly, by measuring a pressure at two arbitrary positions in the gas-phase region or the gas/liquid mixed phase region, the pressure difference can be properly grasped. To the contrary, a liquid-phase region in the condenser exhibits a relatively small specific volume compared to the gas-phase region or the gas/liquid mixed phase region so that a flow speed in the region is also slow and hence, the liquid region is hardly influenced by the flow passage resistance whereby even when a pressure is measured at two positions in the liquid-phase region, the pressure difference can be hardly detected.

Further, in the condenser, corresponding to a heat load of air outside a vehicle and a refrigerant circulation amount, a ratio between a portion which constitutes the gas-phase region or the gas/liquid mixed phase region and a portion which constitutes the liquid-phase region varies. Accordingly, in a case where the condenser is used as a resistive element, when the refrigerant pressure difference is detected between two points including the gas-phase region or the gas/liquid mixed phase region and the liquid-phase region in the inside of the condenser, a region (a length of a flow passage) in the inside of the condenser where a flow speed is fast so that the refrigerant pressure difference can be detected varies depending on a heat load of air outside the vehicle or the refrigerant flow rate and hence, the flow passage resistance also varies whereby the pressure difference cannot be properly grasped thus giving rise to a drawback that a flow rate of a refrigerant cannot be accurately calculated.

The invention has been made in view of the above-mentioned circumstances, and it is a primary object of the invention to provide a drive torque estimation device for a compressor which can secure high estimation accuracy of a drive torque of the compressor by accurately grasping a flow rate of a refrigerant which flows in a refrigerating cycle when the pressure difference of the refrigerant is detected by making use of a condenser as a resistive element for calculating the flow rate of the refrigerant which flows in the refrigerating cycle, and a condenser effectively used for the estimation of the drive torque with high accuracy.

To achieve the above-mentioned object, according to one aspect of the invention, there is provided a drive torque estimation device which calculates an estimated value of a drive torque of a compressor using a flow rate of a refrigerant which flows in a refrigerating cycle including the compressor, a condenser, an expansion device and an evaporator as one of variable parameters, including: a first sensor which detects a physical quantity relating to a pressure of the refrigerant which flows through a predetermined portion of the refrigerating cycle, and a second sensor which detects a physical quantity relating to a pressure of the refrigerant which flows through a predetermined portion downstream of the first sensor in the refrigerating cycle, the flow rate of the refrigerant being calculated based on the difference between refrigerant pressures obtained based on the respective physical quantities detected by the first and second sensors, wherein the first sensor is arranged at a refrigerant inlet of the condenser or at a high-pressure side pipe upstream of the refrigerant inlet, and the second sensor is arranged at a predetermined portion of the condenser which becomes a gas/liquid mixed phase region.

Accordingly, even when the pressure difference is detected using the condenser as a resistive element, the second sensor is arranged at the predetermined portion of the condenser which becomes the gas/liquid mixed phase region and hence, a physical quantity relating to a pressure of the refrigerant can be detected outside a liquid-phase region of the condenser whereby the pressure difference can be properly detected based on physical quantities detected by both sensors.

When the condenser includes a condensing part which condenses a passing refrigerant and a supercooling part which is communicated with the condensing part through a gas/liquid separation part and cools a liquid-phase refrigerant, the second sensor may be arranged at an outlet of the condensing part.

In the condenser of this type, the outlet of the condensing part becomes the position where saturated vapor reaches (forming a gas/liquid mixed phase region rather than a complete liquid-phase region) except for a low load time where an outside air temperature is low or a case where a refrigerant flow rate is small. Accordingly, by arranging the second sensor at such a portion, the refrigerant pressure difference can be properly acquired at a high heat load time where a highly accurate torque estimated value of the compressor becomes particularly necessary.

Further, a plurality of second sensors may be arranged along a refrigerant flow passage of the condenser, and the drive torque estimation device may include a means which selects the second sensor to be used corresponding to an outside air temperature.

As described previously, the position where the saturated vapor reaches varies corresponding to a heat load or a flow rate of a refrigerant and hence, by selecting the second sensor to be used corresponding to the outside air temperature, a physical quantity relating to a pressure of a refrigerant can be measured in a gas/liquid mixed phase region avoiding a liquid-phase region and hence, the refrigerant flow rate can be accurately grasped thus enabling the estimation of a torque of a compressor with high accuracy.

The second sensor may be a temperature sensor which detects a refrigerant temperature at a predetermined portion of the condenser which becomes a gas/liquid mixed phase region. In the gas/liquid mixed phase region (a range where saturated vapor is obtained), by measuring the refrigerant temperature, the refrigerant pressure can be univocally calculated and hence, the torque can be estimated with high accuracy using an inexpensive temperature sensor instead of using a pressure sensor.

Further, in a state where a refrigerant pressure in a high-pressure-side path of the refrigerating cycle is balanced after the refrigerating cycle is stopped, an output value of the first sensor and an output value of the second sensor may be calibrated such that the output value of the first sensor and the output value of the second sensor take the same value. In such a constitution, even when irregularity is present between detection accuracies of the respective sensors or detection characteristics of the sensors change with time, output values of the sensors can be calibrated in a state where the refrigerant pressure in the high-pressure-side path of the refrigerating cycle is balanced and hence, the accurate pressure difference can be always detected.

In constituting the above-mentioned torque estimation device, the provision of the condenser having a first sensor and a second sensor as described above is useful for constituting the drive torque estimation device which can perform highly accurate torque estimation.

That is, a condenser used in the refrigerating cycle may be a condenser which condenses a refrigerant which flows in a refrigerant flow passage by cooling, and includes: a first sensor which detects a physical quantity relating to a pressure of the refrigerant which flows through a predetermined portion of the refrigerant flow passage; and a second sensor which detects a physical quantity relating to a pressure of the refrigerant which flows through a predetermined portion downstream of the first sensor in the refrigerant flow passage, wherein the first sensor is arranged at a refrigerant inlet of the refrigerant flow passage, and the second sensor is arranged at a predetermined portion of the refrigerant flow passage which becomes a gas/liquid mixed phase region.

When the condenser includes a condensing part which condenses a passing refrigerant and a supercooling part which is communicated with the condensing part through a gas/liquid separation part and cools a liquid-phase refrigerant, the second sensor may be arranged at an outlet of the condensing part.

A plurality of second sensors may be arranged along a refrigerant flow passage, and the sensor to be used may be selected corresponding to a heat load (outside air temperature).

Further, the second sensor may be a temperature sensor which detects a refrigerant temperature at a predetermined portion of the refrigerant flow passage which becomes a gas/liquid mixed phase region, and a refrigerant pressure may be calculated based on the detected temperature.

As described above, according to the invention, in calculating an estimated value of a drive torque of the compressor, the first sensor which detects a physical quantity relating to a pressure of a refrigerant which flows in the predetermined portion of the refrigerating cycle is arranged at a refrigerant inlet of the condenser or at a high-pressure-side pipe upstream of the refrigerant inlet, and the second sensor which detects a physical quantity relating to a pressure of the refrigerant which flows in the predetermined portion downstream of the first sensor in the refrigerating cycle is arranged at the predetermined portion which becomes the gas/liquid mixed phase region of the condenser. Accordingly, a physical quantity relating to a pressure of a refrigerant can be detected by the second sensor at a portion avoiding a liquid-phase region, and the pressure difference can be properly detected based on physical quantities detected by the first and second sensors. In this manner, a flow rate of a refrigerant which flows in the refrigerating cycle can be accurately detected thus enhancing the accuracy of estimation of a drive torque of the compressor.

When the condenser includes the condensing part which condenses a passing refrigerant and the supercooling part which is communicated with the condensing part through the gas/liquid separation part and cools the liquid-phase refrigerant, by arranging the second sensor at the outlet of the condensing part, the refrigerant pressure difference at a high load which the drive torque control of the compressor originally requires can be accurately obtained.

Further, by arranging the plurality of second sensors along the flow passage of the condenser, and by selecting the second sensor to be used corresponding to the outside air temperature, even when the position where the saturated vapor reaches varies corresponding to a heat load, a physical quantity relating to a refrigerant pressure can be detected at a portion avoiding a liquid-phase region and hence, the pressure difference can be properly detected whereby a flow rate of a refrigerant can be accurately detected thus eventually enabling the estimation of a torque of the compressor with high accuracy.

Further, by forming the second sensor using the temperature sensor which detects a refrigerant temperature at the predetermined portion which becomes the gas/liquid mixed phase region of the condenser, the torque can be estimated with high accuracy using an inexpensive temperature sensor instead of using a pressure sensor.

Further, in a state where a refrigerant pressure in a high-pressure-side path of the refrigerating cycle is balanced after the refrigerating cycle is stopped, the output value of the first sensor and the output value of the second sensor are calibrated such that the output value of the first sensor and the output value of the second sensor take the same value. Accordingly, even when irregularity is present between detection accuracies of the respective sensors or detection characteristics of the sensors change with time, the accurate pressure difference can be always detected.

BRIEF DESCRIPTION OF THE DRAWINGS

FIG. 3A and FIG. 3B are views for explaining a case where an upstream side pressure sensor is used as a first sensor and a downstream side pressure sensor is used as a second sensor in a receiver-tank integral-type condenser, wherein

FIG. 4A and FIG. 4B are views for explaining a case where an upstream side pressure sensor is used as a first sensor and a downstream side pressure sensor is used as a second sensor in a receiver-tank integral-type condenser, and a plurality of second sensors are arranged along a refrigerant flow passage of the condenser and are selectively used, wherein

FIG. 5A and FIG. 5B are views for explaining a case where an upstream side pressure sensor is used as a first sensor and a downstream side temperature sensor is used as a second sensor in a receiver-tank integral-type condenser, wherein

DESCRIPTION OF THE PREFERRED EMBODIMENTS

Hereinafter, an embodiment of the invention is explained in conjunction with attached drawings.

Figure 1:
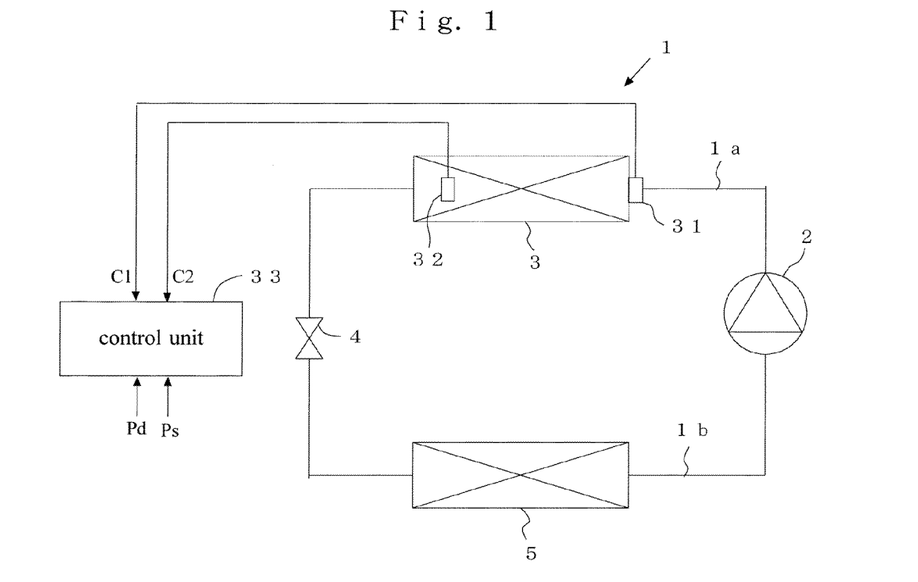
FIG. 1 is a block diagram showing the schematic constitution of a drive torque estimation device for a compressor according to the invention.

In FIG. 1, a refrigerating cycle 1 is a refrigerating cycle used in a vehicle-use air conditioning unit or the like. The refrigerating cycle 1 includes: a compressor 2 which compresses a refrigerant using an engine or a motor as a drive source, and feeds the refrigerant under a pressure; a condenser 3 which condenses a gas-phase refrigerant of high temperature and high pressure fed from the compressor 2 under a pressure by cooling; an expansion device 4 which expands the condensed refrigerant under a reduced pressure; and an evaporator 5 which evaporates the refrigerant expanded by the expansion device 4 under a reduced pressure through a heat exchange with air.

Figure 2:
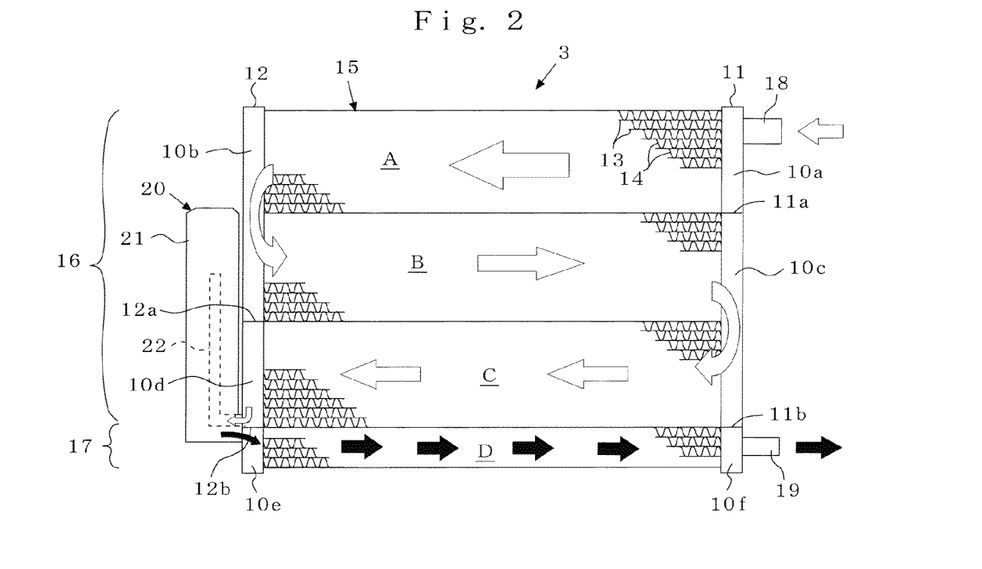
FIG. 2 is a view showing a constitutional example of a condenser used in a refrigerating cycle.

The condenser 3 is arranged on a front surface of a radiator not shown in the drawing, and cools the gas-phase refrigerant of high temperature and high pressure by air obtained by a traveling air or air obtained by an electrically-operated fan. In this embodiment, as shown in FIG. 2, the condenser 3 is constituted by integrally joining: a heat exchange part 15 which is constituted of a pair of header pipes 11, 12 which is arranged approximately parallel to each other with a predetermined distance therebetween, a plurality of flattened tubes 13 by which the pair of header pipes 11, 12 is communicated with each other, and corrugated fins 14 which are arranged between the plurality of tubes 13 (the tubes 13 and fins 14 being partially shown in the drawing); and a gas/liquid separation portion (receiver tank) 20 which is arranged parallel to a side of the header pipe 12.

The heat exchange part 15 is partitioned into a condensing part 16 which is constituted of a portion provided with a predetermined number of tubes 13 on an upper side thereof, and a supercooling part 17 which is constituted of a portion provided with the remaining tubes 13 below the condensing part 16.

The respective header pipes 11, 12 are formed into a hollow shape, and have the inside thereof partitioned into, for example, three inner spaces by partition walls 11a, 11b and 12a, 12b (one header pipe 11 being partitioned into the first, the third and the fifth inner spaces 10a, 10c, 10f by the partition walls 11a, 11b, and the other header pipe 12 being partitioned into the second, the fourth and the sixth inner spaces 10b, 10d, 10e by the partition walls 12a, 12b). The partition walls 11b, 12b are provided at the same position in the axial direction in the respective header pipes 11, 12, while the partition walls 11a, 12a are provided at positions displaced in the axial direction in the respective header pipes 11, 12 (the distance between the partition wall 11a and the partition wall 11b being set longer than the distance between the partition wall 12a and the partition wall 12b). Further, a refrigerant inlet pipe 18 which is communicated with the first inner space 10a and a refrigerant outlet pipe 19 which is communicated with the sixth inner space 10f are connected to one header pipe 11 respectively.

The condensing part 16 is constituted of portions above the partition walls 11b, 12b of the heat exchange part 15. That is, the condensing part 16 is formed of a first path A which guides a refrigerant flown into the first inner space 10a from the refrigerant inlet pipe 18 into the second inner space 10b, a second path B which guides a refrigerant flown into the second inner space 10b into the third inner space 10c, and a third path C which guides a refrigerant flown into the third inner space 10c into the fourth inner space 10d.

The supercooling part 17 is constituted of portions below the partition walls 11b, 12b of the heat exchange part 15, and includes a fourth path D which guides a liquid-phase refrigerant flown into the fifth inner space 10e from the gas/liquid separation part 20 into the sixth inner space 10f, and discharges the liquid-phase refrigerant into the above-mentioned expansion device 4 from the sixth inner space 10f through the refrigerant outlet pipe 19.

The gas/liquid separation part (receiver tank) 20 is constituted by extending a refrigerant introducing pipe 22 in the inside of a hollow case 21 which extends along the header pipe 12 such that the refrigerant introducing pipe 22 extends toward an upper side from a lower side. A desiccant or a filter member is housed in the inside of the case 21 when necessary. An inlet side of the gas/liquid separation part 20 (inlet side of the refrigerant introducing pipe) is connected to the fourth inner space 10d and an outlet side of the gas/liquid separation part 20 is connected to the fifth inner space 10e. Accordingly, the condensing part 16 and the supercooling part 17 are communicated with each other through the gas/liquid separation part 20.

Figure 3A:
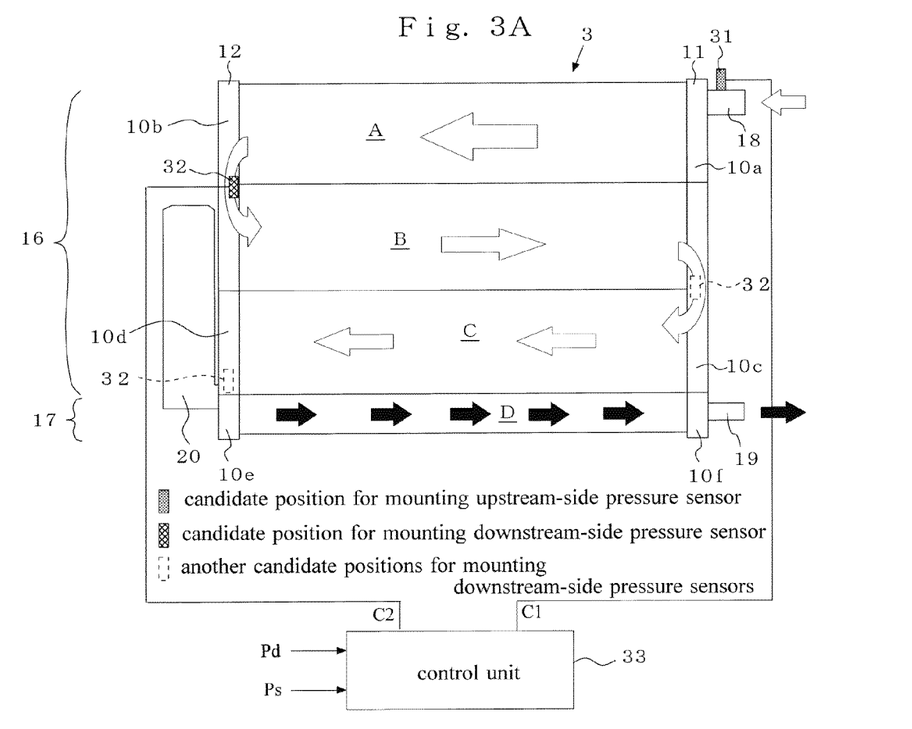
FIG. 3A is a view for explaining the arrangement of the respective sensors.

In the invention, as shown in FIG. 3A, while treating the above-mentioned condenser 3 as a resistive element on the refrigerating cycle (while treating the condenser 3 as a portion where the flow passage resistance is formed), in an area in the vicinity of a refrigerant inlet of the condenser 3 or at a high-pressure side pipe upstream of the refrigerant inlet, an upstream-side pressure sensor 31 (corresponding to the first sensor) which detects a pressure of a refrigerant flowing through the refrigerant inlet or the high-pressure side pipe is arranged, and at a portion of the condenser 3 downstream of the upstream-side pressure sensor on the refrigerant passage, a downstream-side pressure sensor 32 (corresponding to the second sensor) which detects a pressure of a refrigerant flowing through the portion of the condenser 3 is arranged.

Refrigerant pressures (C1, C2) which are detected by the upstream-side pressure sensor 31 and the downstream-side pressure sensor 32 are inputted to a control unit 33 together with a discharge pressure Pd and a suction pressure Ps of the compressor 2 which are detected separately from the refrigerant pressures (C1, C2), and the control unit 33 calculates a torque estimated value of the compressor 2 based on these various signals inputted to the control unit 33.

The upstream-side pressure sensor 31 is mounted in such a manner that, for example, a mounting hole is formed in the refrigerant inlet pipe 18 which constitutes the refrigerant inlet of the condenser 3 or the high-pressure-side pipe (the refrigerant inlet pipe 18 in this embodiment) upstream of the refrigerant inlet pipe 18, and a pressure detection part is mounted in the mounting hole such that the pressure detection part is brought into contact with a refrigerant.

The downstream-side pressure sensor 32 is arranged at a predetermined portion of the condenser 3 which becomes a gas/liquid mixed phase region (a predetermined portion avoiding a region where a liquid-phase refrigerant (supercooled liquid) is present), and detects a pressure of a refrigerant which flows through such a portion.

A refrigerant flows in the condenser 3 in a gas-phase state where the refrigerant has a degree of superheat, and becomes saturated vapor by cooling. Thereafter, condensing is started so that the saturated vapor is brought into a gas/liquid mixed state (a state of wet vapor where saturated vapor and saturated liquid are mixed with each other), and the vapor is brought into a completely liquefied state or a state where a dryness fraction becomes approximately zero and a quantity of saturated liquid is large before the vapor reaches the outlet of the condenser 3.

A boundary position in the condenser where the vapor is shifted to a liquid phase from such a gas/liquid mixed phase (a boundary between wet vapor and a supercooled liquid, that is, a position where saturated vapor reaches) varies corresponding to a change in outside air temperature (heat load) or a flow rate of a refrigerant. However, a liquid phase refrigerant has a small specific volume compared to a gas phase refrigerant and hence, a flow speed becomes slow whereby it is impossible to make the condenser function as a resistive element. Accordingly, the liquid-phase region hardly receives the flow passage resistance so that the pressure difference is hardly generated.

Accordingly, in using the condenser 3 as the resistive element, it is important that a supercooled liquid is not present in the refrigerant flow passage between the portion where the upstream-side pressure sensor 31 is mounted and the portion where the downstream-side pressure sensor 32 is mounted. That is, it is important that the downstream-side pressure sensor 32 is not provided in the liquid-phase region (supercooled liquid region). Accordingly, when the downstream-side pressure sensor 32 is mounted avoiding the liquid-phase region, a flow rate of a refrigerant G can be accurately calculated based on the difference between a pressure detected by the upstream-side pressure sensor 31 and a pressure detected by the downstream-side pressure sensor 32 while taking into account a flow passage length between the sensors and a cross section of the passage. However, when the downstream-side pressure sensor 32 is provided in the liquid-phase region (supercooled liquid region), the position where saturated vapor reaches in the refrigerant flow passage of the condenser 3 becomes indefinite and hence, it is difficult to grasp the refrigerant flow rate G accurately.

In view of the above, the downstream-side pressure sensor 32 is arranged in the second inner space 10b after the vapor passes the first path A, for example, as a portion where saturated vapor is surely present in the evaporator, that is, as a portion where a liquid-phase region (supercooled liquid region) is not formed regardless of a change in a heat load or a change in a flow rate of a refrigerant. To be more specific, the downstream-side pressure sensor 32 is arranged in such a manner that a sensor mounting hole is formed in the header pipe 12, and the downstream-side pressure sensor 32 is mounted in the sensor mounting hole such that a pressure detection part is brought into contact with a refrigerant.

Accordingly, in the above-mentioned constitution, the downstream-side pressure sensor 32 is arranged at the predetermined portion (second inner space) avoiding the liquid-phase region (supercooled liquid region) and detects a pressure of a refrigerant which flows through such a portion and hence, even when the condenser 3 is used as a resistive element, the pressure difference can be properly detected.

Figure 3B:
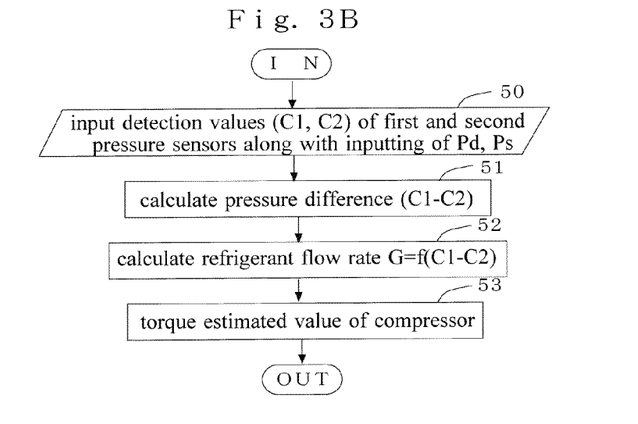
FIG. 3B is a flowchart in accordance with which a torque estimated value of the compressor is calculated.

Accordingly, in the control unit 33, as shown in FIG. 3B, when detection values (C1, C2) of a refrigerant pressure from the upstream-side pressure sensor 31 and the downstream-side pressure sensor 32 are inputted to the control unit 33 together with a discharge pressure Pd and a suction pressure Ps of the compressor 2 in the refrigerating cycle 1 (step 50), the difference (C1−C2) between the inputted refrigerant pressure C1 obtained by the upstream-side pressure sensor 31 and the inputted refrigerant pressure C2 obtained by the downstream-side pressure sensor 32 is calculated (step 51), a flow rate of a refrigerant G is calculated based on the refrigerant pressure difference (G=f(C1−C2)) (step 52) and, thereafter, a torque estimated value of the compressor is calculated based on the above-mentioned formula 1 (step 53) whereby the pressure difference can be properly detected. Accordingly, the refrigerant flow rate G can be accurately calculated and, eventually, a torque of the compressor 2 can be accurately estimated.

In the above-mentioned constitution, the case where the downstream-side pressure sensor 32 is arranged in the second inner space 10b which the vapor passes through after the vapor passes through the first path A is exemplified. However, in a case where the position at which saturated vapor reaches is surely arranged on a further downstream side or in a case where the estimation of the torque of the compressor is performed only at a high heat load time in a limited manner, the arrangement position of the downstream-side pressure sensor 32 may be set in the third inner space 10c which the vapor passes through after the vapor passes through the second path B or in the fourth inner space 10d which the vapor passes through after the vapor passes through the third path C as indicated by a broken line in FIG. 3A.

Particularly, in the condenser 3 having the above-mentioned constitution which includes the condensing part 16 which condenses a passing refrigerant and a supercooling part 17 which is communicated with the condensing part 16 through the gas/liquid separation part 20 and cools a liquid-phase refrigerant, the downstream-side pressure sensor 32 may be arranged at an outlet of the condensing part (fourth inner space 10d).

In the above-mentioned constitution, to eliminate a calculation error of the pressure difference due to irregularity in reference values of the upstream-side pressure sensor 31 and the downstream-side pressure sensor 32, it is desirable to calibrate an output value of the upstream-side pressure sensor 31 and an output value of the downstream-side pressure sensor 32 such that these output values have the same value in a state where a refrigerant pressure in a high-pressure-side passage 1a (passage ranging from the compressor to the expansion device) of the refrigerating cycle 1 is balanced after the refrigerating cycle 1 is stopped.

A considerable time (2 to 3 hours) is required until a pressure in the high-pressure-side passage and a pressure in the low-pressure-side passage of the refrigerating cycle are balanced and hence, by calibrating output values of the respective pressure sensors such that these output values have the same value in a state where the pressure in the high-pressure-side passage 1a (the passage ranging from the compressor to the expansion device) is balanced, the calibration can be performed within a short time so that the accurate detection of the pressure difference is secured.

Figure 4A:
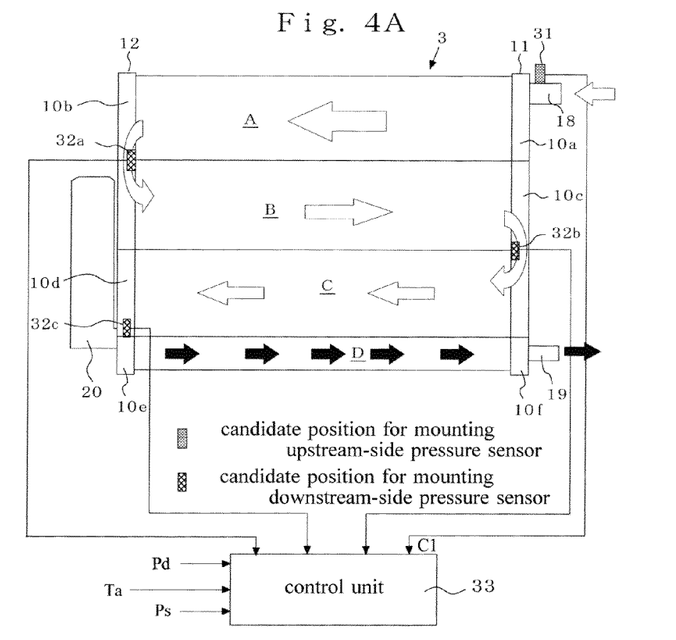
FIG. 4A is a view for explaining the arrangement of the respective sensors.

In the above-mentioned constitution, a case where the downstream-side pressure sensor 32 is provided only at one predetermined portion is exemplified. However, as shown in FIG. 4A, the downstream-side pressure sensors 32a to 32c may be provided at the above-mentioned candidate portions respectively (a plurality of downstream-side pressure sensors may be arranged along the refrigerant flow passage of the condenser 3), and a second sensor to be used may be selected corresponding to the outside air temperature Ta.

Figure 4B:
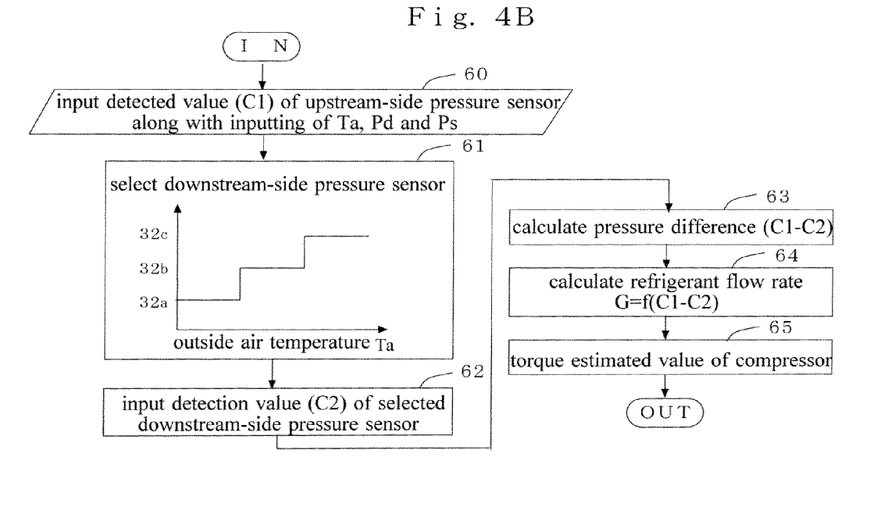
FIG. 4B is a flowchart in accordance with which a torque estimated value of the compressor is calculated.

That is, as shown in FIG. 4B, an outside air temperature Ta and a discharge pressure Pd and a suction pressure Ps of a compressor 2 are inputted into a control unit 33, and a detected value (C1) of a refrigerant pressure is inputted to the control unit 33 from an upstream-side pressure sensor 31 (step 60). In this case, a position at which saturated vapor reaches can be estimated based on the outside air temperature Ta and hence, the downstream-side pressure sensor which is remotest from the upstream-side pressure sensor 31 within a range where the saturated vapor is obtained is selected (step 61), and a detection pressure value of the selected downstream-side pressure sensor is read (step 62). Thereafter, the difference (C1−C2) between the refrigerant pressure C1 obtained by the upstream-side pressure sensor 31 and a refrigerant pressure C2 obtained by the selected downstream-side pressure sensor 32 is calculated (step 63), a flow rate of a refrigerant G (G=f(C1−C2)) is calculated based on the refrigerant pressure difference (step 64) and, thereafter, a torque estimated value of a compressor is calculated based on the above-mentioned formula 1 (step 65).

In such a constitution, the downstream-side pressure sensor which is remotest from the upstream-side pressure sensor is used corresponding to an outside air temperature out of the downstream-side pressure sensors which is not present in the liquid-phase region and hence, it is possible to make the condenser 3 surely function as the resistive element so that the pressure difference can be properly measured.

In this embodiment, the explanation has been made with respect to the case where the downstream-side pressure sensor which is remotest from the upstream-side pressure sensor 31 is selected based on the outside air temperature Ta. However, the downstream-side pressure sensor may be selected by taking into account a discharge pressure Pd and a suction pressure Ps of the compressor in addition to the outside air temperature Ta. That is, the downstream-side pressure sensor may be selected by making use of a characteristic that a flow rate of a refrigerant is relatively large when the pressure difference between the discharge pressure Pd and the suction pressure Ps is large so that a position where saturated vapor reaches is likely to reach a more downstream side of the flow passage of the condenser, and when the pressure difference between the discharge pressure Pd and the suction pressure Ps is small, the position where the saturated vapor reaches is likely to be more upstream side of the flow passage of the condenser. In this case, a heat load state of an evaporator can be also reflected compared to the control based on the outside air temperature Ta and hence, the selection of the desired downstream-side pressure sensor from a plurality of downstream-side pressure sensors can be made more properly.

In the above-mentioned constitution, the case where the pressure sensor is used as the second sensor is exemplified. However, in a gas/liquid mixed phase (wet vapor region), a temperature and a pressure are univocally decided based on a saturated pressure temperature characteristic and hence, a temperature sensor (downstream-side temperature sensor 34) may be used in place of the pressure sensor. For example, in an example shown in FIG. 5A, to measure a refrigerant temperature at an outlet (fourth inner space 10d) of a condensing part 16 of a condenser 3, the downstream-side pressure sensor 34 is fixed to an outer surface of a portion of a header pipe 12 where the fourth inner space is formed such that a temperature sensing part of the downstream-side temperature sensor 34 is brought into contact with the outer surface.

Figure 5A:
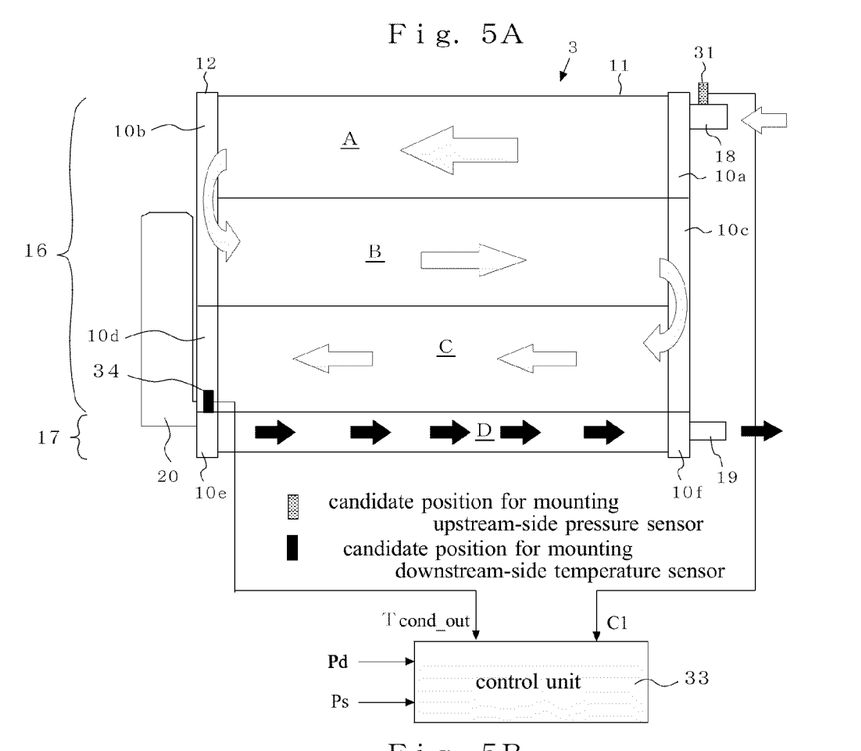
FIG. 5A is a view for explaining the arrangement of the respective sensors.
Figure 5B:
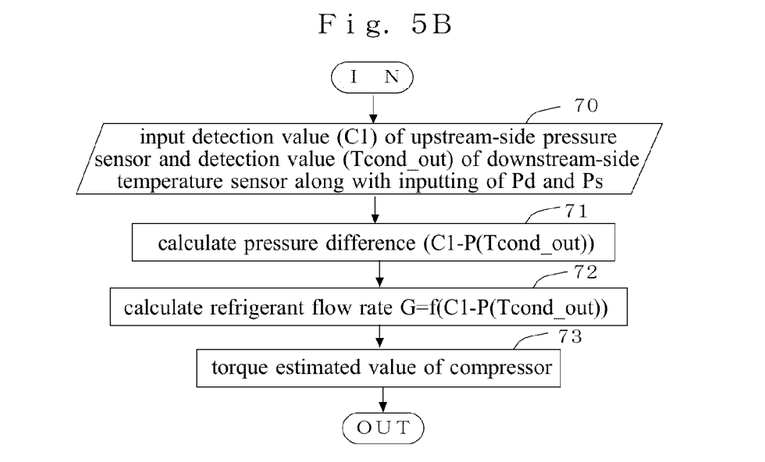
FIG. 5B is a flowchart in accordance with which a torque estimated value of the compressor is calculated.

In such a constitution, as shown in FIG. 5B, when a detection value (C1) of an upstream-side pressure sensor 31 and a detection value (Tcond_out) of the downstream-side temperature sensor 34 are inputted to the control unit 33 along with inputting of a discharge pressure Pd and a suction pressure Ps of a compressor 2 (step 70), the difference (C1−P(Tcond_out)) between the refrigerant pressure C1 obtained by the upstream-side pressure sensor 31 and a saturated pressure P (Tcond_out) univocally calculated based on the refrigerant temperature detected by the downstream-side temperature sensor 34 is calculated (step 71), a flow rate of a refrigerant G (G=f(C1−P(Tcond_out))) is calculated based on the refrigerant pressure difference (step 72) and, thereafter, a torque estimated value of the compressor is calculated based on the above-mentioned formula 1 (step 73).

Accordingly, due to such a constitution, using a temperature sensor which is less costly than a pressure sensor, a flow rate of a refrigerant can be accurately grasped and a torque of the compressor can be accurately estimated based on the flow rate.

In the above-mentioned constitution, the case where the downstream-side temperature sensor 34 is provided at the outlet of the condensing part 16 is exemplified. However, the downstream-side temperature sensor 34 may be mounted on a surface of the header pipe 11, 12 or a tube 13 of the condenser upstream of the outlet of the condensing part 16 provided that the surface is a portion where the temperature of the refrigerant in a gas/liquid mixed phase (wet vapor region) can be surely detected.

DESCRIPTION OF THE NUMERALS

1 refrigerating cycle
1a high-pressure-side passage
2 compressor
3 condenser
4 expansion device
5 evaporator
16 condensing part
17 supercooling part
20 gas/liquid separation portion
31 upstream-side pressure sensor (the first sensor)
32 downstream-side pressure sensor (the second sensor)
32a, 32b, 32c downstream-side pressure sensor
34 downstream-side temperature sensor

What is claimed is:

1. A drive torque estimation device which calculates an estimated value of a drive torque of a compressor using a flow rate of a refrigerant which flows in a refrigerating cycle including the compressor, a condenser, an expansion device and an evaporator as one of variable parameters comprising: a first sensor which detects a physical quantity relating to a pressure of the refrigerant which flows through a predetermined portion of the refrigerating cycle; and a second sensor which detects a physical quantity relating to a pressure of the refrigerant which flows through a predetermined portion downstream of the first sensor in the refrigerating cycle, the flow rate of the refrigerant being calculated based on the difference between refrigerant pressures obtained based on the respective physical quantities detected by the first and second sensors, wherein
the first sensor is arranged at a refrigerant inlet of the condenser or at a high-pressure side pipe upstream of the refrigerant inlet, and
the second sensor is arranged at a predetermined portion of the condenser which avoids a region where a liquid-phase refrigerant is present and becomes a gas/liquid mixed phase region.

2. The drive torque estimation device for a compressor according to claim 1, wherein the condenser includes a condensing part which condenses a passing refrigerant and a supercooling part which is communicated with the condensing part through a gas/liquid separation part and cools a liquid-phase refrigerant, and
the second sensor is arranged at an outlet of the condensing part.

3. The drive torque estimation device according to claim 2, wherein the second sensor is arranged at an outlet of the condensing part.

4. The drive torque estimation device for a compressor according to claim 1, wherein a plurality of second sensors are arranged along a refrigerant flow passage of the condenser, and
the drive torque estimation device includes a means which selects a sensor to be used corresponding to an outside air temperature.

5. The drive torque estimation device according to claim 4, wherein the drive torque estimation device includes a means which selects the second sensor to be used corresponding to an outside air temperature.

6. The drive torque estimation device for a compressor according to claim 1, wherein the second sensor is a temperature sensor which detects a refrigerant temperature at a predetermined portion of the condenser which becomes a gas/liquid mixed phase region.

7. The drive torque estimation device for a compressor according to claim 1, wherein in a state where a refrigerant pressure in a high-pressure-side path of the refrigerating cycle is balanced after the refrigerating cycle is stopped, an output value of the first sensor and an output value of the second sensor are calibrated such that the output value of the first sensor and the output value of the second sensor take the same value.

8. A condenser used in a refrigerating cycle which condenses a refrigerant which flows in a refrigerant flow passage by cooling, the condenser comprising:
a first sensor which detects a physical quantity relating to a pressure of the refrigerant which flows through a predetermined portion of the refrigerant flow passage; and
a second sensor which detects a physical quantity relating to a pressure of the refrigerant which flows through a predetermined portion downstream of the first sensor in the refrigerant flow passage, wherein
the first sensor is arranged at a refrigerant inlet of the refrigerant flow passage, and the second sensor is arranged at a predetermined portion of the refrigerant flow passage which avoids a region where a liquid-phase refrigerant is present and becomes a gas/liquid mixed phase region.

9. The condenser according to claim 8, wherein the condenser includes a condensing part which condenses a passing refrigerant and a supercooling part which is communicated with the condensing part through a gas/liquid separation part and cools a liquid-phase refrigerant, and
the second sensor is arranged at an outlet of the condensing part.

10. The condenser according to claim 9, wherein the second sensor is arranged at an outlet of the condensing part.

11. The condenser according to claim 8, wherein a plurality of second sensors are arranged along a refrigerant flow passage.

12. The condenser according to claim 8, wherein the second sensor is a temperature sensor which detects a refrigerant temperature at a predetermined portion of the refrigerant flow passage which becomes a gas/liquid mixed phase region.

13. A method of calculating an estimated value of a drive torque of a compressor comprising:

providing a refrigerating cycle including the compressor, a condenser, an expansion device and an evaporator;

providing a refrigerant which flows through the refrigerating cycle;

detecting, with a first sensor, a physical quantity relating to a pressure of the refrigerant which flows through a predetermined portion of the refrigerating cycle;

detecting, with a second sensor, a physical quantity relating to a pressure of the refrigerant which flows through a predetermined portion downstream of the first sensor in the refrigerating cycle;

calculating a flow rate of the refrigerant based on the difference between refrigerant pressures obtained based on the respective physical quantities detected by the first and second sensors, wherein the first sensor is arranged at a refrigerant inlet of the condenser or at a high-pressure side pipe upstream of the refrigerant inlet, and the second sensor is arranged at a predetermined portion of the condenser which becomes a gas/liquid mixed phase region.

14. The method according to claim 13, wherein the physical quantities detected by the second sensor are detected outside a liquid-phase region of the condenser.

* * * * *